United States Patent
Wang et al.

(10) Patent No.: US 12,145,585 B2
(45) Date of Patent: Nov. 19, 2024

(54) COOPERATIVE CONTROL MODULE, ADAPTIVE CRUISE SYSTEM AND CONTROL METHOD THEREOF, AND VEHICLE

(71) Applicant: JIANGSU UNIVERSITY, Zhenjiang (CN)

(72) Inventors: Ruochen Wang, Zhenjiang (CN); Wei Liu, Zhenjiang (CN); Renkai Ding, Zhenjiang (CN); Yu Jiang, Zhenjiang (CN); Xiangpeng Meng, Zhenjiang (CN); Zeyu Sun, Zhenjiang (CN); Dong Sun, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 18/572,213

(22) PCT Filed: Mar. 15, 2023

(86) PCT No.: PCT/CN2023/081599
§ 371 (c)(1),
(2) Date: Dec. 20, 2023

(87) PCT Pub. No.: WO2023/174327
PCT Pub. Date: Sep. 21, 2023

(65) Prior Publication Data
US 2024/0262355 A1    Aug. 8, 2024

(30) Foreign Application Priority Data
Mar. 17, 2022   (CN) .......................... 202210264283.5

(51) Int. Cl.
*B60W 30/14*     (2006.01)
*B60W 10/22*     (2006.01)
(Continued)

(52) U.S. Cl.
CPC .......... *B60W 30/143* (2013.01); *B60W 10/22* (2013.01); *B60W 40/105* (2013.01);
(Continued)

(58) Field of Classification Search
None
See application file for complete search history.

(56) References Cited

U.S. PATENT DOCUMENTS 9,126,593 B2 *  9/2015  Saito ..................... F16F 15/002
9,187,090 B2 * 11/2015  Shiozawa ............. B60W 40/10
(Continued)

FOREIGN PATENT DOCUMENTS

CN     103909803 A    7/2014
CN     113276615 A    8/2021
(Continued)

OTHER PUBLICATIONS

Zhu Xu, Research on Active Body Attitude Control of Vehicle with ACC System Based on ECAS, Guizhou University Master's Theses, 2019, pp. 1-79, China Academic Journal Electronic Publishing House.
(Continued)

*Primary Examiner* — Jonathan M Dager
(74) *Attorney, Agent, or Firm* — Bayramoglu Law Offices LLC (57) ABSTRACT

A cooperative control module, an adaptive cruise system and a control method thereof, and a vehicle are provided. The adaptive cruise system comprises a vehicle sensor module, a driving environment intelligent sensing module, a vehicle state response estimation module, an adaptive cruise and controllable suspension cooperative control module, and a power control module. The control method of adaptive cruise is optional, one is according to the cruise speed set by the driver, and the other one is according to the cruise
(Continued)

comfort set by the driver. In the case of adaptive cruising according to cruise comfort, the optimal cruise speed is intelligently calculated by the adaptive cruise and controllable suspension system based on driving conditions and driver's demands. The controllable suspension is controlled cooperatively during cruising, and the suspension control parameters are adaptively switched according to the performance requirements of the vehicle under different driving conditions.

10 Claims, 3 Drawing Sheets

(51) Int. Cl.
 *B60W 40/105* (2012.01)
 *B60W 50/06* (2006.01)
 *B60W 50/00* (2006.01)

(52) U.S. Cl.
 CPC ..... *B60W 50/06* (2013.01); *B60W 2050/0014* (2013.01); *B60W 2510/22* (2013.01); *B60W 2552/00* (2020.02); *B60W 2720/103* (2013.01)

(56) References Cited

U.S. PATENT DOCUMENTS

| | | | | |
|---|---|---|---|---|
| 10,005,457 | B2* | 6/2018 | Kanou | B60W 30/02 |
| 10,160,447 | B2* | 12/2018 | Lavoie | B60W 50/00 |
| 10,173,677 | B2* | 1/2019 | Fairgrieve | F16H 61/0213 |
| 10,363,790 | B2* | 7/2019 | Hoffmann | B60G 17/02 |
| 10,406,882 | B2* | 9/2019 | Lakehal-Ayat | B60G 17/0182 |
| 10,821,968 | B2* | 11/2020 | Cho | B60W 10/18 |
| 11,055,550 | B2* | 7/2021 | Kim | G06V 20/58 |
| 11,491,971 | B2* | 11/2022 | Ito | B60T 8/30 |
| 2003/0014174 | A1* | 1/2003 | Giers | B60T 8/1755 701/79 |
| 2004/0040765 | A1* | 3/2004 | Satou | B60K 31/04 180/170 |
| 2011/0213527 | A1* | 9/2011 | Itabashi | B60W 10/11 701/37 |
| 2012/0316744 | A1* | 12/2012 | Shimura | F02D 29/02 701/72 |
| 2014/0088849 | A1* | 3/2014 | Ham | G06F 17/00 701/70 |
| 2014/0163837 | A1* | 6/2014 | Um | B60W 30/143 701/93 |
| 2016/0264136 | A1* | 9/2016 | Minoiu Enache | B60W 30/095 |
| 2019/0111925 | A1* | 4/2019 | Sata | B60W 10/30 |
| 2020/0031188 | A1* | 1/2020 | Wang | B60G 17/015 |
| 2020/0262477 | A1* | 8/2020 | Hirao | B60G 17/015 |
| 2020/0384980 | A1* | 12/2020 | Yu | G05D 1/0088 |
| 2022/0324421 | A1* | 10/2022 | Giovanardi | B60W 40/06 |

FOREIGN PATENT DOCUMENTS

| | | |
|---|---|---|
| CN | 114559938 A | 5/2022 |
| WO | 2014027069 A1 | 2/2014 |
| WO | 2018122586 A1 | 7/2018 |

OTHER PUBLICATIONS

ISO 2631-1, Mechanical vibration and shock—Evaluation of human exposure to whole-body vibration—, Part 1: General requirements, International Standard, 1997, pp. 1-31.

* cited by examiner

COOPERATIVE CONTROL MODULE, ADAPTIVE CRUISE SYSTEM AND CONTROL METHOD THEREOF, AND VEHICLE

CROSS REFERENCE TO THE RELATED APPLICATIONS

This application is the national phase entry of International Application No. PCT/CN2023/081599, filed on Mar. 15, 2023, which is based upon and claims priority to Chinese Patent Application No. 202210264283.5, filed on Mar. 17, 2022, the entire contents of which are incorporated herein by reference.

TECHNICAL FIELD

The present disclosure relates an adaptive cruise system and a control method thereof, and belongs to the technical field of auxiliary driving and vehicle chassis dynamics control.

BACKGROUND

Adaptive cruise is an important intelligent auxiliary system in current vehicle driving process, which can greatly reduce the fatigue of long-distance driving and provide drivers with a more relaxed and comfortable driving experience. Cruise control actually refers to the vehicle speed control, which belongs to vehicle longitudinal dynamics control. At present, the research on adaptive cruise control mainly focuses on speed tracking and obstacle avoidance, and few studies consider the ride comfort and handling performance of vehicles during cruise. The ride comfort and handling performance of the vehicle are related to vertical dynamic control. Although the controllable suspension system can improve the vertical dynamic performance of the vehicle through semi-active/active control, the control effect is greatly affected by the vehicle speed. Under the same road condition, higher vehicle speed will lead to poor ride comfort and handling performance. How to coordinate adaptive cruise and controllable suspension control to improve the vertical dynamic performance of vehicles during cruise through longitudinal and vertical cooperative control, the current research fails to give an effective solution.

SUMMARY

In view of the shortcomings in the prior art, the present disclosure provides an adaptive cruising system and a control method thereof, which effectively improves the vertical dynamic performance of the vehicle during cruising.

The disclosure achieves the technical purpose through the following technical means:

An adaptive cruise and controllable suspension cooperative control module comprises an adaptive cruise control submodule and a suspension control submodule;

the adaptive cruise control submodule is configured to deal with an adaptive cruise control command, where the adaptive cruise control command comprises a cruise speed intelligent setting command configured to calculate an optimal cruise speed during a cruise speed intelligent setting process;

the suspension control submodule is configured to switch a corresponding controllable suspension control parameter according to a real-time dynamic performance requirement of the vehicle.

In the above solution, the adaptive cruise control submodule determines a desired RMS value of weighted acceleration of a vehicle centroid based on a set target comfort level, and calculates an optimal cruise speed in combination with a current road information.

In the above solution, the controllable suspension control parameter is determined by means of:

firstly, judging dynamic performance requirements of the vehicle under different driving conditions by combining a road condition and a vehicle speed, and designing a comprehensive performance evaluation function representing different dynamic performance of the vehicle, where the comprehensive performance evaluation function simultaneously considers ride comfort and handling performance of the vehicle; and then, taking the comprehensive performance evaluation function as a fitness function, and obtaining the suspension control parameter for different dynamic performance requirements of the vehicle by using an optimization algorithm.

The present disclosure also provides an adaptive cruise system, which comprises the above cooperative control module.

In the above solution, the adaptive cruise and controllable suspension cooperative control module receives a signal from a sensor module, a driving environment intelligent sensing module and a vehicle state response estimation module, and sends an optimal cruise speed to a power control module.

In the above solution, the sensor module is configured to obtain a vehicle speed signal, a brake pedal signal, a road information measurement signal, a vehicle distance signal, and a vehicle dynamic response signal.

In the above solution, the driving environment intelligent sensing module acquires a road condition, and a driving behavior signal of a vehicle ahead based on a road information measurement signal and a vehicle distance signal.

In the above solution, the vehicle state response estimation module obtains a vehicle state information based on a road information measurement signal and a vehicle dynamic response signal.

In the above solution, the power control module sends a throttle opening signal to a power system and a brake pressure signal to a brake system based on an optimal cruise speed.

The present disclosure also provides a vehicle, which comprises the above adaptive cruise system.

The control method of adaptive cruise control system is specified as follows:

The adaptive cruise control submodule determining a desired RMS value of weighted acceleration of a vehicle centroid based on a set target comfort level, and calculating an optimal cruise speed in combination with a current road condition.

Furthermore, the control method also includes:

Firstly, the suspension control submodule determining a current dynamic performance requirement of the vehicle based on a vehicle speed and a road condition; and then based on which, switching a corresponding controllable suspension control parameter; subsequently, calculating an ideal suspension control force based on an adopted control strategy, a controllable suspension control parameter and a current vehicle state information; finally, sending a control signal to a vehicle suspension system to track the ideal suspension control force for vibration suppression.

Furthermore, the optimal cruise speed is obtained by the following way:

Firstly, obtaining an RMS value of weighted acceleration of a vehicle centroid under different road excitation and different vehicle speed by simulation, and fitting a functional relationship between RMS value of weighted acceleration of vehicle centroid and vehicle speed under different driving conditions, that is, the ideal cruising speed calculation formula;

then, selecting a corresponding ideal cruising speed calculation formula according to an identified road condition, determining a desired RMS value of weighted acceleration of a vehicle centroid based on a ride comfort level selected by a driver, and calculating an ideal cruising speed by substituting the desired RMS value into selected ideal cruising speed calculation formula; and finally, substituting the ideal cruising speed into a simulation model to obtain an RMS value of suspension rattle space and dynamic wheel load under driving conditions. If there is the risk of hitting the limit block or losing the wheel-road contact, compensating the ideal cruising speed to get the optimal cruise speed.

Furthermore, the risk of hitting the limit block is determined by: If the RMS value of suspension rattle space exceeds one third of the maximum value, the suspension has a 99.7% probability of hitting the limit block, and the ideal cruising speed needs to be compensated; on the contrary, the speed is not compensated.

Furthermore, the risk of losing wheel-road contact is determined by: If the RMS value of dynamic wheel load exceeds one third of wheel static load, there is a 99.7% probability of losing the wheel-road contact, and the ideal cruising speed needs to be compensated; on the contrary, the speed is not compensated.

Furthermore, compensation for the ideal cruising speed is achieved by:

$$v_{optimal} = \left(1 - \sum_{i=1}^{4} \frac{rms(F_{d\_i}) - 1/3 \cdot F_{start\_i}}{F_{start\_i}} - \sum_{i=1}^{4} \frac{rms(f_{d\_i}) - 1/3 \cdot f_{max}}{f_{max}}\right) \times v_{ideal}$$

where $rms(F_{d\_i})$ is the RMS value of dynamic load of each wheel; $rms(f_{d\_i})$ is the RMS value of suspension rattle space at each corner of the vehicle; $F_{start\_i}$ is the static load of each wheel, i=1, 2, 3 and 4, which is corresponding to four wheels, respectively; $f_{max}$ is the maximum suspension rattle space; and $v_{ideal}$ is the ideal cruising speed.

Furthermore, the controllable suspension control parameter is determined by means of:

Firstly, judging dynamic performance requirements of the vehicle under different driving conditions by combining a road condition and a vehicle speed, and designing a comprehensive performance evaluation function representing different dynamic performance of the vehicle, where the comprehensive performance evaluation function simultaneously considers ride comfort and handling performance of the vehicle; then taking the comprehensive performance evaluation function P as a fitness function, and using an optimization algorithm to obtain the controllable suspension control parameter under different dynamic performance requirements of the vehicle.

Furthermore, the expression of comprehensive performance evaluation function P is as follows:

$$P = \sqrt{w_1 \cdot \frac{rms(\ddot{z}_s)}{rms(\ddot{z}_{sf})} + w_2 \cdot \frac{rms(F_d)}{rms(F_{df})}}$$

where, $w_1$ and $w_2$ are the weight coefficients of ride comfort and handling performance, respectively; $rms(\ddot{z}_s)$ is the RMS values of the weighted acceleration of vehicle centroid; $rms(F_d)$ is the average of the RMS values of the dynamic loads of the four wheels; $rms(\ddot{z}_{sf})$ and $rms(F_{df})$ are the relevant values for the reference passive suspension.

Furthermore, the dynamic performance requirements of the vehicle under different driving conditions are as follows: when the vehicle travels at a speed greater than or equal to 90 km/h, the vehicle dynamic performance requirement is handling performance; when the vehicle travels at a speed less than 30 km/h, the vehicle dynamic performance requirement is ride comfort.

Furthermore, the control strategy comprises a model predictive control strategy, a linear quadratic optimal control strategy, or a modified skyhook control strategy.

Furthermore, the priority of dynamic performance requirements of the vehicle is higher than that of comfort requirements.

The disclosure has the following beneficial effects:

(1) The present disclosure calculates optimal cruise speed by the adaptive cruise control submodule, and switches corresponding controllable suspension control parameters according to the real-time vehicle dynamic performance requirements by the suspension control submodule. Through the cooperative control of adaptive cruise and controllable suspension based on the optimal cruise speed and controllable suspension control parameters, the ride comfort and handling performance issues caused by subjective driver behavior during the cruise speed setting process can be effectively improved.

(2) The present disclosure determines desired RMS value of weighted acceleration of vehicle centroid based on a set target comfort level, and calculates optimal cruise speed in combination with the current road condition, which can guarantee the vertical dynamic performance during the cruise process of the vehicle.

(3) The present disclosure determines whether to compensate the ideal cruising speed by judging the risk of hitting the limit block or losing the wheel-road contact, which improves the ride comfort of the vehicle as much as possible on the premise of ensuring the handling performance.

(4) The present disclosure designs a comprehensive performance evaluation function to represent different vehicle dynamic performance, and takes the comprehensive performance evaluation function as the fitness function to obtain the control parameters under different vehicle dynamic performance requirements by using optimization algorithm. The dynamic performance requirements of the vehicle are different under different driving conditions (different road condition and different vehicle speed). Based on the optimized control parameters, the vehicle suspension system can be controlled according to the actual driving conditions, so as to achieve the best vertical performance of the vehicle under different driving conditions.

(5) The sensor module of present disclosure comprises a body acceleration sensor, a wheel acceleration sensor and a binocular camera. The body acceleration sensor is configured to obtain the vertical vehicle body vibration acceleration signal. The wheel acceleration sensor is configured to acquire the vertical wheel vibration acceleration signal. The vertical vehicle body vibration acceleration and vertical wheel vibration acceleration are configured to estimate the vehicle state information during the driving process. By combining the vehicle state information and controllable suspension control parameters, the ideal suspension control force can be calculated. The binocular camera collects the current road information to obtain the road condition in front of the vehicle, which is configured to analyze the real-time dynamic performance requirements of the vehicle. On this basis, the carried-out suspension control is in real time, and the control effect is obvious.

(6) The adaptive cruise control command described in this present disclosure includes a cruise speed intelligent setting command. When executing the cruise speed intelligent setting command, the optimal cruise speed and ideal suspension control force are determined intelligently. Compared with the traditional adaptive cruise, the independent selection of ride comfort of the vehicle in the adaptive cruise process can be achieved.

(7) The present disclosure judges the risk of hitting the limit block or losing the wheel-road contact according to the "3 Sigma principle" in the random process theory, so that the obtained risk judgment reliability is high, with a reliability of 99.7%.

(8) The present disclosure calculates the speed compensation based on the RMS value of suspension rattle space and dynamic wheel load at current speed to obtain the optimal cruise speed. Through speed compensation, the safety and handling performance of vehicles during adaptive cruise can be ensured.

(9) Aiming at different suspension control objectives, the present disclosure designs a comprehensive performance evaluation function, which represents the different performances of the vehicle. And then taking the comprehensive performance evaluation function as the fitness function, the suspension control parameters under different driving conditions are obtained by using genetic algorithm. Based on the optimized control parameters, the vehicle suspension system can be controlled according to the actual driving conditions, and the vertical comprehensive performance of vehicles under different driving conditions can be optimized.

(10) The dynamic performance requirements of the vehicle for different driving conditions in the present disclosure are as follows: when the vehicle travels on smooth roads at a high speed, the dynamic performance requirements of vehicle are handling performance; when the vehicle travels on poor roads, the dynamic performance requirements of the vehicle are ride comfort. By precisely dividing the performance requirements, it is possible to determine the suspension control objectives under different driving conditions (vehicle speed and road condition) and provide a reasonable basis for the optimization of suspension control parameters.

BRIEF DESCRIPTION OF THE DRAWINGS

In order to more clearly illustrate the technical solutions in the embodiments of the present disclosure, the figure to be used in the description of the embodiments will be briefly described below. It is obvious that the figures described below are only some embodiments of the present disclosure, and other figures may be obtained from these figures without any creative effort by those of ordinary skill in the art.

DETAILED DESCRIPTION OF THE EMBODIMENTS

To provide a clearer understanding of the purpose, technical solution, and advantages of the embodiment of the present disclosure, the following will further explain the technical solution of the embodiment with reference to the figures. It is evident that the described embodiment is a partial embodiment of the present disclosure, rather than the entirety of the embodiments. Based on the embodiments in the present disclosure, all other embodiments obtained by a person of ordinary skill in the art without making creative labor fall within the scope of protection of the present disclosure.

Figure 1:
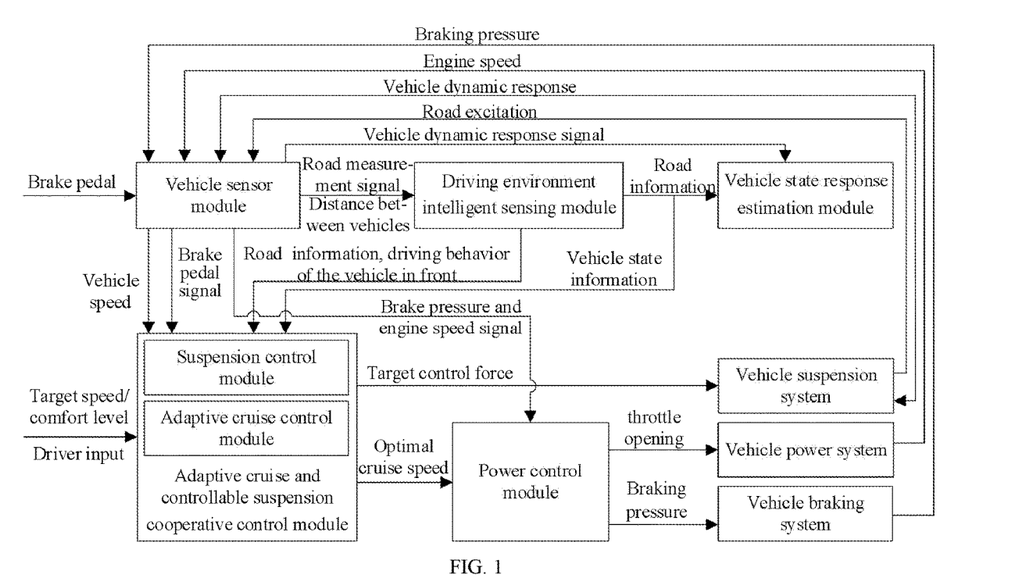
FIG. 1 is the architecture scheme of the adaptive cruise system described in the present disclosure.

As shown in FIG. 1, an adaptive cruise system is provided in the present disclosure, which comprises a vehicle sensor module, a driving environment intelligent sensing module, a vehicle state response estimation module, an adaptive cruise and controllable suspension cooperative control module, and a power control module. The adaptive cruise and controllable suspension cooperative control module is connected to the vehicle sensor module, driving environment intelligent sensing module, vehicle state response estimation module, and power control module, respectively.

The vehicle sensor module is configured to collect vehicle's relevant data required to serve road information identification, vehicle state response estimation, and cooperative control of adaptive cruise and controllable suspension. In the present disclosure, the vehicle sensor module comprises a vehicle body acceleration sensor, four wheel acceleration sensors, a binocular camera, a millimeter wave radar, a brake pedal sensor, a brake pressure sensor, and an engine speed sensor.

The driving environment intelligent sensing module identifies road information based on binocular camera, recognizes driving state of the vehicle ahead based on millimeter wave radar, and transmits the relevant information to the vehicle state response estimation module and the adaptive cruise and controllable suspension cooperative control module, which provide a data support for the estimation of the vehicle state variables and the cooperative control of the adaptive cruise and controllable suspension.

The vehicle state response estimation module estimates state information during driving in real time based on signals from the body acceleration sensor and wheel acceleration sensor (i.e., the vehicle dynamic response signals), as well as the road information output from the driving environment intelligent sensing module, to provide front-end information for the adaptive cruise and controllable suspension cooperative control module.

The adaptive cruise and controllable suspension cooperative control module consists of two submodules: an adaptive cruise control submodule and a suspension control module. The adaptive cruise control submodule is configured to process adaptive cruise control commands issued by the driver and to calculate optimal cruise speed in adaptive cruise speed intelligent setting process. The suspension control submodule is configured to issue output force control commands to the suspension system according to the dynamic performance requirements of the vehicle and driver comfort requirements during driving process. The priority of dynamic performance requirements of the vehicle is higher than that of the driver's comfort requirements, which is determined based on the road condition and vehicle speed. In the embodiment of the present disclosure, the adaptive cruise control commands issued by the driver include an adaptive cruise start command, an adaptive cruise termination command, a cruise speed manual setting command, and a cruise speed intelligent setting command.

The power control module is configured to issue a throttle opening control command to the power system and a brake pressure control command to the brake system based on optimal cruise speed given by the adaptive cruise control submodule in the adaptive cruise and controllable suspension cooperative control module, the brake pressure collected in real time by the brake pressure sensor, and the engine speed collected in real time by the engine speed sensor, respectively.

Referring specifically to FIG. 1, for the adaptive cruise system of the embodiment of the present disclosure, the vehicle sensor module sends vehicle speed and brake pedal signals (collected by the brake pedal sensor) to the adaptive cruise and controllable suspension cooperative control module, sends road information measurement signals and vehicle distance signals to the driving environment intelligent sensing module, and sends vehicle dynamic response signals to the vehicle state response estimation module, respectively. The driving environment intelligent sensing module sends road information measurement signals to the vehicle state response estimation module, sends road information measurement signals and driving behavior signals of the front vehicle to the adaptive cruise and controllable suspension cooperative control module. The vehicle state response estimation module sends vehicle state information to the adaptive cruise and controllable suspension cooperative control module. The adaptive cruise and controllable suspension cooperative control module sends optimal cruise speed signals to the power control system and target control force signals to the suspension system. The power control module sends throttle opening signals to the power system and brake pressure signals to the brake system, respectively.

The adaptive cruise and controllable suspension system of the embodiment of the present disclosure sends control commands to the power system, the braking system and the suspension system, respectively, in accordance with the vehicle speed demand of the adaptive cruise control submodule and the control force demand of the suspension control submodule, through the setting of the adaptive cruise and controllable suspension cooperative control module. On the basis of realizing adaptive cruise, vehicle vertical dynamic performance during adaptive cruise is improved through the cooperative control of adaptive cruise and controllable suspension.

Figure 2:
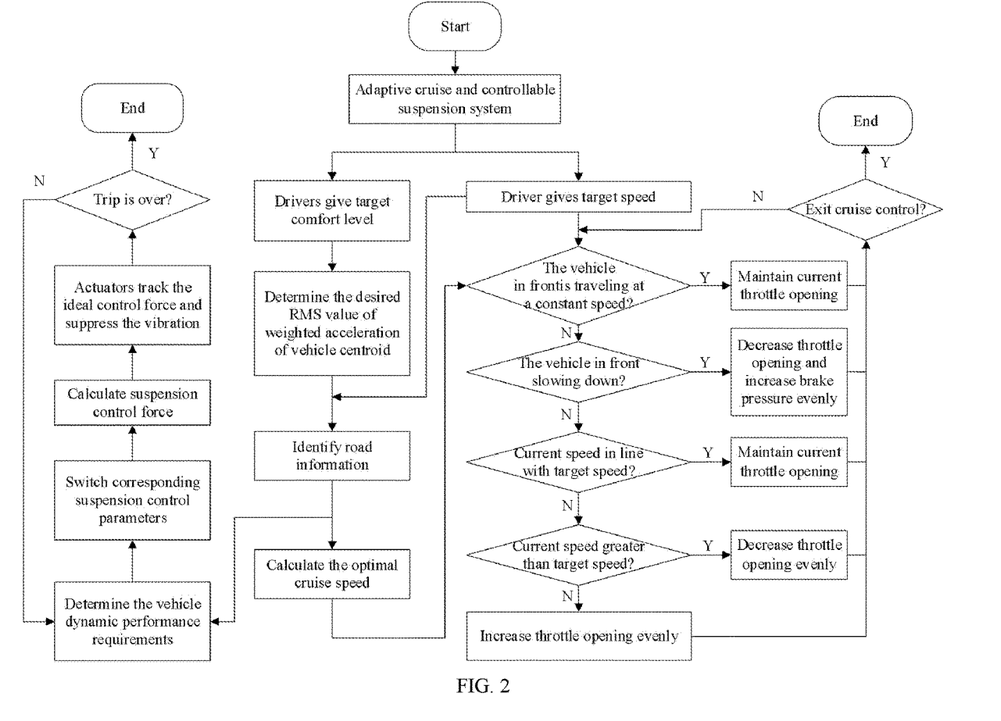
FIG. 2 is the flowchart of the adaptive cruise cooperative control method described in the present disclosure.

Based on the aforementioned adaptive cruise system, the embodiment of the present disclosure also gives a cooperative control method of the adaptive cruise system. The flowchart of cooperative control method is shown in FIG. 2, which specifically includes the following steps:

Step 1: when the vehicle is traveling on the road, the adaptive cruise control mode is turned on, and the adaptive cruise control submodule accepts the driver's control signal. If the driver chooses to set the cruise speed manually, turn to Step 2 and Step 10; if the driver chooses to set the cruise speed intellectually, go to Step 7;

Step 2: if the vehicle ahead is traveling at a uniform speed, the power control module sends control signals to the power system to maintain the current engine throttle opening and keep a safe distance from the vehicle in front, go to Step 6; if the vehicle in front is not traveling at a uniform speed, go to Step 3;

Step 3: if the vehicle ahead slows down, the power control module sends control signals to the power system and brake system to uniformly reduce the engine throttle opening and increase the brake pressure, so as to adjust the current vehicle speed to maintain a safe distance from the vehicle in front, go to Step 6; if the front vehicle accelerates, go to Step 4;

Step 4: if the current driving speed is consistent with the driver's set cruising speed, the power control module sends control signals to the power system to maintain the current engine throttle opening, go to Step 6; if the current driving speed is inconsistent with the driver's set cruising speed, go to Step 5;

Step 5: if the current driving speed is greater than the driver's set cruising speed, the power control module sends control signals to the power system to evenly reduce the engine throttle opening, and goes to Step 6; if the current driving speed is less than the driver's set cruising speed, the power control module sends control signals to the power system to evenly increase the engine throttle opening, and goes to Step 6;

Step 6: if the driver has not opted out of the adaptive cruise control mode, go to Step 2; otherwise the adaptive cruise control submodule accepts the driver control signal (brake pedal signal) and exits this service;

Step 7: the adaptive cruise control submodule of the adaptive cruise and controllable suspension cooperative control module determines the desired RMS value of weighted acceleration of vehicle centroid based on the target comfort level set by the driver, go to Step 8;

Step 8: the adaptive cruise control submodule determines the current road condition based on the road information identified by the binocular camera in the sensor module, and goes to Steps 9 and 10;

Step 9: the adaptive cruise control submodule calculates the optimal cruise speed based on the desired RMS value of weighted acceleration of vehicle centroid as well as the current road condition, and goes to Step 2;

Step 10: the suspension control submodule of the adaptive cruise and controllable suspension cooperative control module determines the current dynamic performance requirements of the vehicle based on the current vehicle speed and road condition, and goes to Step 11;

Step 11: the suspension control submodule switches the corresponding controllable suspension control parameters according to the current dynamic performance requirements of the vehicle, go to Step 12;

Step 12: the suspension control submodule calculates an ideal suspension control force based on an adopted control strategy (e.g., model predictive control strategy, linear quadratic optimal control strategy and modified skyhook control strategy, etc.), the controllable suspension control parameters determined in the step 11) and current vehicle state information, and goes to Step 13;

Step 13: the suspension control submodule sends control signals to the vehicle suspension system to track the ideal suspension control force for vibration suppression, go to Step 14;

Step 14: if the trip does not end, go to Step 10; otherwise end this service.

In the adaptive cruise and controllable suspension cooperative control method of the present disclosure, the priority of the control commands based on driving behavior of the vehicle in front is greater than that based on the current vehicle driving state.

Figure 3:
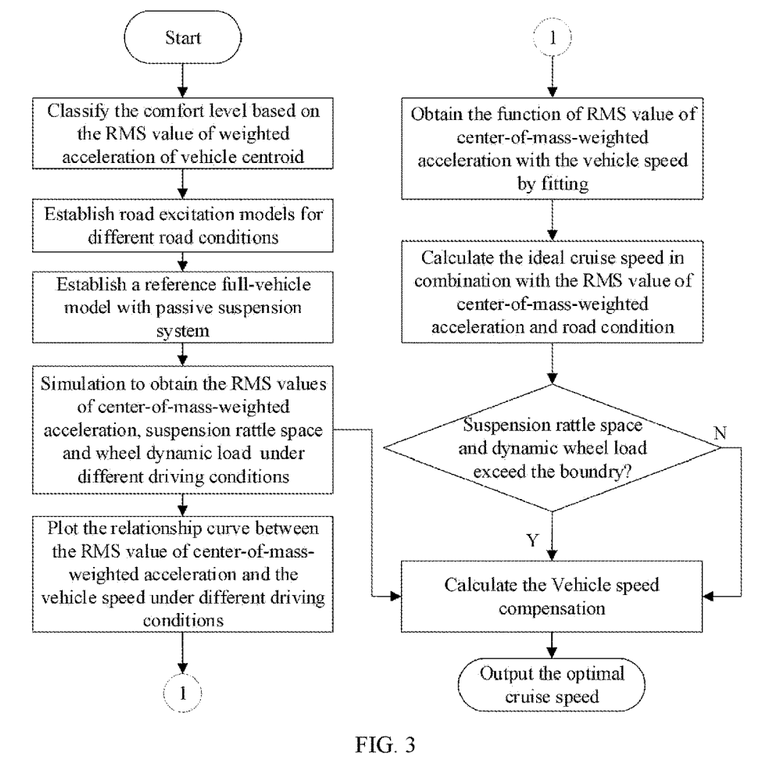
FIG. 3 is the flowchart of the calculation method of the optimal cruise speed described in the present disclosure.

FIG. 3 shows a flowchart of the method for calculating the optimal cruise speed provided by the embodiment of the present disclosure, specifically comprising the following steps:

Step 1: classify the comfort level based on the RMS value of weighted acceleration of vehicle centroid, and go to Step 2; the mapping relationship between the RMS value of weighted acceleration of vehicle centroid and the comfort level is determined according to the international standard ISO 2631, as shown in Table 1.

TABLE 1

Comfort level and corresponding RMS value of weighted acceleration of vehicle centroid.

| RMS value of weighted acceleration of vehicle centroid | Comfort level |
|---|---|
| <0.315 | Not uncomfortable |
| 0.315~0.63 | A little uncomfortable |
| 0.5~1.0 | Fairly uncomfortable |
| 0.8~1.6 | Uncomfortable |
| 1.25~2.5 | Very uncomfortable |
| >2.0 | Extremely uncomfortable |

Step 2: establish road excitation models for different road conditions, and go to Step 3; the embodiment of the present disclosure classifies different road conditions according to the road roughness, and illustrates the specific process by taking three common classes of roads (Class A, B and C) as examples. Firstly, the white noise filtering method is used for the construction of road excitation model for a single wheel. On this basis, the road excitation model for four wheels is established according to the principle of coherence between the road excitation on the left and right wheels and the principle of time delay between the road excitation on the front and rear axles. The expression of the road excitation for single wheel based on the filtered white noise method is: $\dot{z}_r(t) = -2\pi f_o v z_r(t) + 2\pi n_0 \sqrt{G_q(n_0) v} \cdot w(t)$, where $f_0$ is the cutoff frequency, which is generally taken as 0.011 Hz; $n_0$ is the reference spatial frequency, $n_0=0.1$ m$^{-1}$; w(t) is the random white noise in the time domain; $z_r(t)$ is the road roughness in the time domain (road vertical displacement); v is the vehicle speed; $G_q(n_0)$ is the road roughness coefficient, which is shown in TABLE 2.

TABLE 2

Criteria for classifying road roughness levels

| Road roughness level | A | B | C |
|---|---|---|---|
| $G_q(n_0)$/m$^3$ | 16 × 10$^{-6}$ | 64 × 10$^{-6}$ | 256 × 10$^{-6}$ |

Step 3: establish a reference model of the whole vehicle with passive suspension system, go to Step 4; the embodiment of the present disclosure illustrates the specific modeling process by the example of a linearized whole vehicle with passive suspension system, where the differential equation of motion of vehicle centroid is:

$$\begin{cases} m_s \ddot{z}_s = -F_{LF} - F_{RF} - F_{LR} - F_{RR} \\ I_\theta \ddot{\theta} = a(F_{LF} + F_{RF}) - b(F_{LR} + F_{RR}) \\ I_\varphi \ddot{\varphi} = -\frac{1}{2} B_f (F_{LF} - F_{RF}) - \frac{1}{2} B_r (F_{LR} - F_{RR}) \end{cases}$$

the differential equations of motion for unsprung mass of each suspension system are as follows:

$$\begin{cases} m_{u1} \ddot{z}_{u1} = -k_t(z_{u1} - z_{r1}) + F_{LF} \\ m_{u1} \ddot{z}_{u2} = -k_t(z_{u2} - z_{r2}) + F_{RF} \\ m_{u2} \ddot{z}_{u3} = -k_t(z_{u3} - z_{r3}) + F_{LR} \\ m_{u2} \ddot{z}_{u4} = -k_t(z_{u4} - z_{r4}) + F_{RR} \end{cases}$$

where, the displacement of sprung mass of each suspension system is:

$$\begin{cases} z_{s1} = z_s - a\theta + B_f \varphi/2 \\ z_{s2} = z_s - a\theta - B_f \varphi/2 \\ z_{s3} = z_s + b\theta + B_r \varphi/2 \\ z_{s4} = z_s + b\theta - B_r \varphi/2 \end{cases}$$

where, the suspension force comprises spring forces and damping forces:

$$\begin{cases} F_{LF} = k_{s1}(z_{s1} - z_{u1}) + c_1(\dot{z}_{s1} - \dot{z}_{u1}) \\ F_{RF} = k_{s1}(z_{s2} - z_{u2}) + c_1(\dot{z}_{s2} - \dot{z}_{u2}) \\ F_{LR} = k_{s2}(z_{s3} - z_{u3}) + c_2(\dot{z}_{s3} - \dot{z}_{u3}) \\ F_{RR} = k_{s2}(z_{s4} - z_{u4}) + c_2(\dot{z}_{s4} - \dot{z}_{u4}) \end{cases}$$

where, $m_s$ is the vehicle sprung mass; $m_{ui}(i=1,2)$ is the unsprung mass of front and rear wheel; $I_\theta$ is the vehicle's pitching moment of inertia; $I_\varphi$ is the vehicle's roll moment of inertia; a is the distance from centroid to front axle; b is the distance from centroid to rear axle; $B_f$ is the front wheelbase; $B_r$ is the rear wheelbase; $c_i(i=1,2)$ is the damping coefficient of front and rear suspension; $k_{si}(i=1,2)$ is the stiffness coefficient of front and rear suspension; $k_t$ is the wheel stiffness; $\theta$ is the body pitch angle; $\ddot{\theta}$ is the body pitch angle acceleration; $\varphi$ is the body roll angle; $\ddot{\varphi}$ is the body roll angle acceleration; $z_{si}(i=1,2,3,4)$ is the road input of each wheel; $F_{LF}$ is the left-front suspension force; $F_{RF}$ is the right-front suspension force; $F_{LR}$ is the left-rear suspension force; $F_{RR}$ is the right-rear suspension force; $z_s$ is the displacement of vehicle centroid; $\ddot{z}_s$ is the acceleration of vehicle centroid; $\dot{z}_{si}(i=1,2,3,4)$ is the speed at the joint between each suspension and vehicle body; $\dot{z}_{ui}(i=1,2,3,4)$ is the unsprung mass acceleration of each wheel. The system parameters used in this embodiment of the present disclosure are given in TABLE 3.

TABLE 3

Parameters of the vehicle with passive suspension system

| Parameter | Unit | Value |
|---|---|---|
| $m_s$ | kg | 1380 |
| $m_{u1}$ | kg | 40.5 |
| $m_{u2}$ | kg | 45.4 |
| $I_\theta$ | kg · m$^2$ | 2440 |
| $I_\varphi$ | kg · m$^2$ | 380 |

TABLE 3-continued

Parameters of the vehicle with passive suspension system

| Parameter | Unit | Value |
|---|---|---|
| a | m | 1.25 |
| b | m | 1.51 |
| $B_f$ | m | 0.74 |
| $B_r$ | m | 0.74 |
| $c_1$ | N · s/m | 1500 |
| $c_2$ | N · s/m | 1500 |
| $k_{s1}$ | N/m | 17000 |
| $k_{s2}$ | N/m | 22000 |
| $k_t$ | N/m | 192000 |

Figure 5:
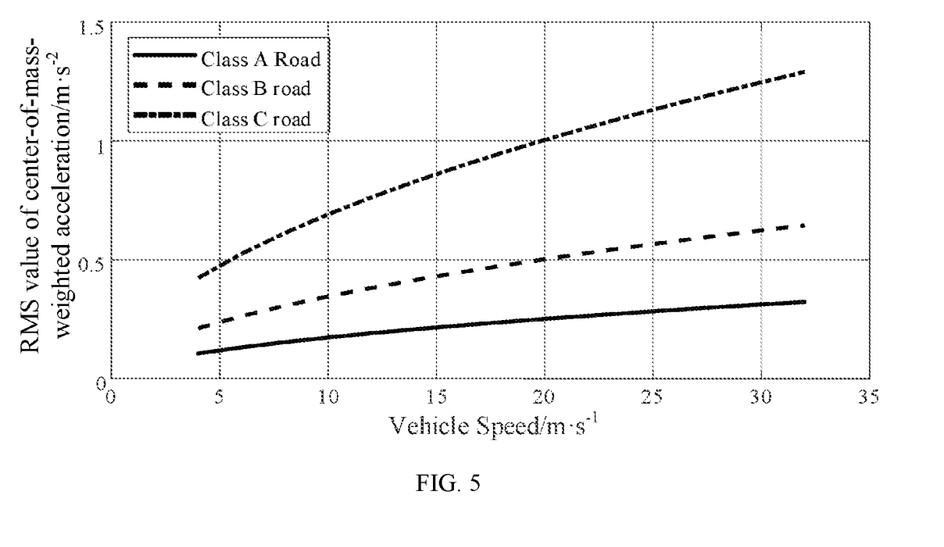
FIG. 5 shows the relationship curve between the RMS value of the weighted acceleration of vehicle centroid and the vehicle speed under different driving conditions.
Figure 6:
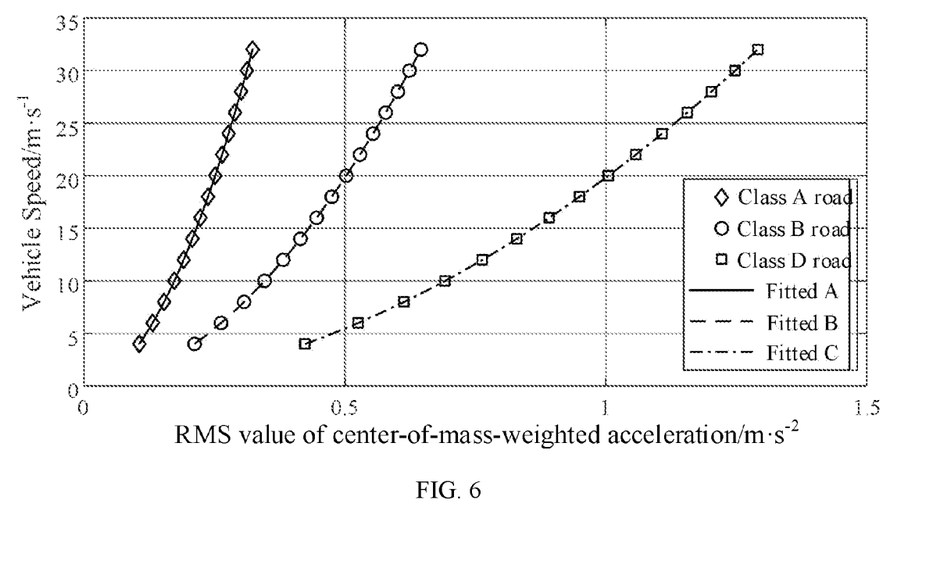
FIG. 6 shows the relationship curve of the fitted vehicle speed versus the RMS value of the weighted acceleration of vehicle centroid.

Step 4: use the dynamics simulation software to simulate the dynamic performance of the vehicle with passive suspension under different road conditions and speeds. The simulation time is set to be 5 s to obtain the RMS values of weighted acceleration of vehicle centroid, suspension rattle space and dynamic wheel load under different driving conditions (different road condition and different vehicle speed), go to Step 5;

Step 5: plot the relationship curve between the RMS value of the weighted acceleration of vehicle centroid and the vehicle speed under various driving conditions; the obtained relationship curve in the embodiment of the present disclosure is shown in FIG. 5, go to Step 6;

Step 6: fit the above relationship curves to obtain a comparison of the fitted curves with the original curves as shown in FIG. 6, as well as the vehicle speed as a function of RMS value of weighted acceleration of vehicle centroid for different driving conditions, go to Step 7; the obtained functions are the formula for calculating the comfort-oriented ideal cruising speed in embodiments of the present disclosure, which are shown in TABLE 4.

TABLE 4

Formulas for calculating the comfort-oriented ideal cruising speed

| Road level | Formulas for calculating ideal cruising speed $v_{ideal}$ (where, x is the RMS value of weighted acceleration of vehicle centroid) |
|---|---|
| A | $v_{ideal} = 265.2x^2 + 15.43x - 0.5927$ |
| B | $v_{ideal} = 66.36x^2 + 7.662x - 0.5848$ |
| C | $v_{ideal} = 16.58x^2 + 3.849x - 0.5901$ |

Step 7: determine the corresponding calculation formula of ideal cruising speed based on the identified road information, and calculate the ideal cruising speed in combination with the RMS value of weighted acceleration of vehicle centroid under the driver's set comfort level, go to Step 8;

Step 8: substitute the ideal cruising speed into the simulation module to obtain the RMS values of suspension rattle space and dynamic wheel load of each suspension, and judge whether the RMS value of suspension rattle space and dynamic wheel load of each suspension exceeds the boundary or not. If either of the two exceeds the boundary, go to Step 9, otherwise go to Step 10. In the embodiment of the present disclosure, the boundary values of the suspension rattle space and dynamic wheel load are determined according to the "3σ principle" in the theory of stochastic processes. If the RMS value of each suspension rattle space and dynamic wheel load exceeds one-third of the maximum suspension rattle space or static wheel load, there is a 99.7% probability of hitting the limiter block or losing the wheel-road contact. The determined boundaries are as follows:

$$\text{rms}(f_{d\_i}) < \frac{1}{3} \cdot f_{max}, \text{ and } \text{rms}(F_{d\_i}) < \frac{1}{3} \cdot F_{start\_i}$$

where, $\text{rms}(f_{d\_i})$ is the RMS value of each suspension rattle space; $f_{max}$ is the maximum suspension rattle space; $\text{rms}(F_{d\_i})$ is the RMS value of each dynamic wheel load; $F_{start\_i} = (m_{si} + m_{ui}) \cdot g$ is the static wheel load; $m_{si}$ (i=1,2,3,4) is the sprung mass on each wheel, and each axle have equal sprung masses on the left and right wheels, respectively, i.e., $m_{s1} = m_{s2} = 377.5$ kg, $m_{s3} = m_{s4} = 312.5$ kg.

Step 9: calculate the speed compensation at the current vehicle speed according to the RMS values of the suspension rattle space and dynamic wheel load to obtain the optimal cruise speed, and go to Step 10; the specific calculation method are as follows:

$$v_{optimal} = \left(1 - \sum_{i=1}^{4} \frac{\text{rms}(F_{d\_i}) - 1/3 \cdot F_{start\_i}}{F_{start\_i}} - \sum_{i=1}^{4} \frac{\text{rms}(f_{d\_i}) - 1/3 \cdot f_{max}}{f_{max}}\right) \times v_{ideal}$$

where, $v_{ideal}$ is the calculated ideal cruising speed from Step 6; $v_{optimal}$ is compensated optimal cruise speed with i=1, 2, 3, 4 corresponding to the four wheels;

Step 10: output the optimal cruise speed.

Figure 4:
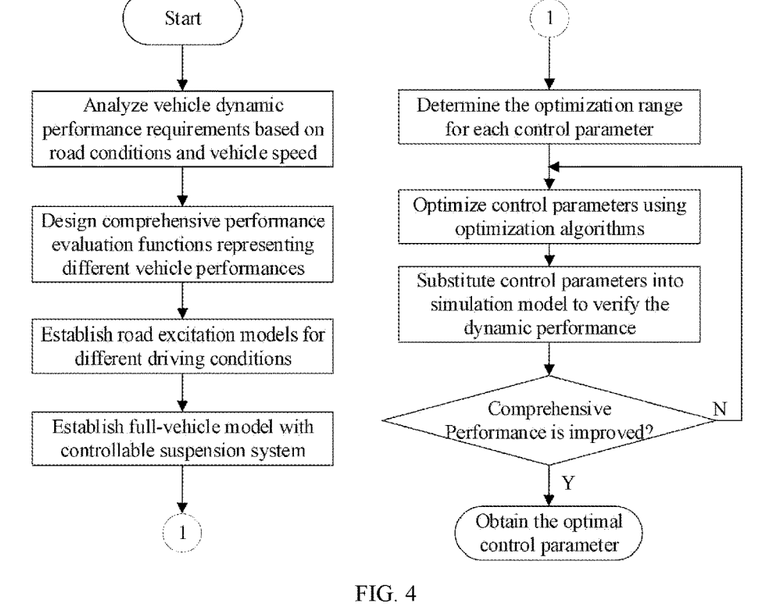
FIG. 4 is the flowchart of the optimization of the controllable suspension control parameters described in the present disclosure.

FIG. 4 shows a flowchart of the optimization method of controllable suspension control parameters in the present disclosure. The controllable suspension system in the embodiment uses a magnetorheological damper with adjustable damping as the actuator and a modified skyhook control strategy as the control method to suppress the vehicle vibration. The steps are as follows:

Step 1: analyze the vehicle dynamic performance by combining the road information and vehicle speed, so as to obtain the suspension control objectives under each driving condition, go to Step 2; the determined specific control objectives in the embodiment of the present disclosure are shown in TABLE 5.

TABLE 5

Vehicle dynamic performance requirements under different driving conditions.

| | Vehicle speed | | | |
|---|---|---|---|---|
| Road level | 0~30 km/h | 30~60 km/h | 60~90 km/h | 90~120 km/h |
| A | | Ride comfort | Comprehensive performance | Handling performance |
| B | | Ride comfort | Comprehensive performance | Handling performance |
| C | | Ride comfort | Comprehensive performance | Handling performance | |

Step 2: design comprehensive performance evaluation functions representing different vehicle performances for different suspension control objectives, go to Step 3; the comprehensive performance evaluation function designed in the embodiment of the present disclosure is as follows:

$$P = \sqrt{w_1 \cdot \frac{\text{rms}(\ddot{z}_s)}{\text{rms}(\ddot{z}_{sf})} + w_2 \cdot \frac{\text{rms}(F_d)}{\text{rms}(F_{df})}}$$

where, $w_1$ and $w_2$ are the weighting coefficients of ride comfort and handling performance, respectively; rms($\ddot{z}_s$) is the RMS values of the weighted acceleration of vehicle centroid; rms($F_d$) is the average of the RMS values of the dynamic loads of the four wheels; rms($\ddot{z}_{sf}$) and rms($F_d$) are the relevant values for the reference passive suspension. Based on the vehicle dynamic performance requirements under different driving conditions determined in Step 1, the weighting coefficients under different control objectives are obtained as shown in TABLE 6.

TABLE 6

Weighting coefficients under different control objectives

| Road level | Vehicle speed | | | |
|---|---|---|---|---|
| | 0~30 km/h | 30~60 km/h | 60~90 km/h | 90~120 km/h |
| A | $w_1 = 0.9$, $w_2 = 0.1$ | $w_1 = 0.5$, $w_2 = 0.5$ | $w_1 = 0.2$, $w_2 = 0.8$ | |
| B | $w_1 = 0.8$, $w_2 = 0.2$ | $w_1 = 0.4$, $w_2 = 0.6$ | $w_1 = 0.2$, $w_2 = 0.8$ | |
| C | $w_1 = 0.7$, $w_2 = 0.3$ | $w_1 = 0.4$, $w_2 = 0.6$ | $w_1 = 0.1$, $w_2 = 0.9$ | |

Step 3: establish road excitation models for different driving conditions using the modeling approach described in optimal cruise speed calculation process, go to Step 4;

Step 4: establish a whole-vehicle model with magnetorheological semi-active suspensions (a type of whole-vehicle model with controllable suspension system), and go to Step 5; in the embodiment of the present disclosure, a seven-degree-of-freedom model of the whole vehicle is used for the optimization of controllable suspension control parameters. The differential equation of motion of vehicle centroid is as follows:

$$\begin{cases} m_s \ddot{z}_s = -F_{LF} - F_{RF} - F_{LR} - F_{RR} \\ I_\theta \ddot{\theta} = a(F_{LF} + F_{RF}) - b(F_{LR} + F_{RR}) \\ I_\varphi \ddot{\varphi} = -\frac{1}{2}B_f(F_{LF} - F_{RF}) - \frac{1}{2}B_r(F_{LR} - F_{RR}) \end{cases}$$

the differential equations of motion for unsprung mass of each suspension system are as follows:

$$\begin{cases} m_{u1}\ddot{z}_{u1} = -k_t(z_{u1} - z_{r1}) + F_{LF} \\ m_{u2}\ddot{z}_{u2} = -k_t(z_{u2} - z_{r2}) + F_{RF} \\ m_{u3}\ddot{z}_{u3} = -k_t(z_{u3} - z_{r3}) + F_{LR} \\ m_{u4}\ddot{z}_{u4} = -k_t(z_{u4} - z_{r4}) + F_{RR} \end{cases}$$

where, the displacement of sprung mass of each suspension system is:

$$\begin{cases} z_{s1} = z_s - a\theta + \frac{1}{2}B_f\varphi \\ z_{s2} = z_s - a\theta - \frac{1}{2}B_f\varphi \\ z_{s3} = z_s + b\theta + \frac{1}{2}B_r\varphi \\ z_{s4} = z_s + b\theta - \frac{1}{2}B_r\varphi \end{cases}$$

where, the suspension force comprises spring forces an actuator forces:

$$\begin{cases} F_{LF} = k_{s1}(z_{s1} - z_{u1}) + F_1 \\ F_{RF} = k_{s1}(z_{s2} - z_{u2}) + F_2 \\ F_{LR} = k_{s2}(z_{s3} - z_{u3}) + F_3 \\ F_{RR} = k_{s2}(z_{s4} - z_{u4}) + F_4 \end{cases}$$

where $F_i$(i=1,2,3,4) is the output force of the magnetorheological damper, and the other parameters are the same as the passive suspension. Then under the modified skyhook control:

$$F_i = \begin{cases} c_{pi}(\dot{z}_{si}(t) - \dot{z}_{ui}(t)) + c_{si}\dot{z}_{si}(t), & \dot{z}_{si}(t)(\dot{z}_{si}(t) - \dot{z}_{ui}(t)) \geq 0 \\ c_{min}(\dot{z}_{si}(t) - \dot{z}_{ui}(t)), & \dot{z}_{si}(t)(\dot{z}_{si}(t) - \dot{z}_{ui}(t)) < 0 \end{cases}$$

where $c_{pi}$ is the passive damping coefficient, $c_{si}$ is the skyhook damping coefficient, and $c_{min}$ is the minimum damping coefficient of the magnetorheological damper. In the embodiment of the present disclosure, $c_{min}$=700 N·s/m, and the same control parameters are used for the front suspension and the rear suspension, respectively. The control parameters to be determined contain two groups, namely front suspension control parameters ($c_{p2}$, $c_{s1}$) and rear suspension control parameters ($c_{p2}$, $c_{s2}$);

Step 5: according to the external characteristic parameters of the magnetorheological damper used in the embodiment of the present disclosure, the optimization ranges of the control parameters are determined to be 700 N·s/m≤$c_{pi}$≤2000 N·s/m and 1000 N·s/m≤$c_{si}$≤4000 N·s/m, respectively; go to Step 6;

Step 6: the embodiment of the present disclosure takes the comprehensive performance evaluation function designed in Step 2 as the fitness function, and adopts a genetic algorithm to search for the optimal suspension control parameters under each driving condition based on the optimization ranges of control parameters determined in Step 5, go to Step 7;

Step 7: substitute the optimized control parameters into the simulation model (the whole vehicle model with magnetorheological semi-active suspension) to evaluate dynamic performance, if the comprehensive performance is optimized, go to Step 8, otherwise go to Step 6;

Step 8: a set of optimal control parameters for the suspension is constructed, and the control parameters obtained by optimization in the embodiment of the present disclosure are shown in TABLE 7.

TABLE 7

Optimized suspension control parameters ($c_{p1}$, $c_{s1}$), ($c_{p2}$, $c_{s2}$)

| Road level | Vehicle speed | | | |
|---|---|---|---|---|
| | 0~30 km/h | 30~60 km/h | 60~90 km/h | 90~120 km/h |
| A | | (705.9, 3825.2) | (1019.7, 3509.7) | (1983.9, 1445.2) |
| | | (700.4, 3963.9) | (1300.3, 2471.9) | (1802.3, 1003.5) |
| B | (708.0, 3811.9) | (1462.0, 2726.7) | | (1999.7, 1075.9) |
| | (798.0, 3976.6) | (1375.8, 2069.5) | | (1785.2, 1224.7) |
| C | (973.1, 3744.4) | (1448.1, 1389.7) | (1942.2, 1092.5) | |
| | (988.8, 3697.9) | (1386.8, 1425.1) | (1973.4, 1080.5) | |

The described embodiments are preferred embodiments of the present disclosure, but the present disclosure is not limited to the above embodiments, and any obvious improvements, substitutions, or variations that can be made by a person skilled in the art without departing from the substance of the present disclosure fall within the scope of protection of the present disclosure.

What is claimed is:

1. A control method of an adaptive cruise system, wherein an adaptive cruise control submodule determines a desired RMS value of weighted acceleration of a vehicle centroid according to a set target comfort level, and calculates an optimal cruise speed by combining the desired RMS value with a road condition;

wherein the optimal cruise speed is obtained in the following way:

obtaining an RMS value of weighted acceleration of the vehicle centroid under different road excitations and different vehicle speeds by simulation, and fitting a functional relationship between RMS value of weighted acceleration of the vehicle centroid and a vehicle speed under different driving conditions, that is, an ideal cruising speed calculation formula;

selecting a corresponding ideal cruising speed calculation formula according to an identified road condition, determining a desired RMS value of weighted acceleration of the vehicle centroid based on a ride comfort level selected by a driver, and calculating an ideal cruising speed by substituting the desired RMS value into selected ideal cruising speed calculation formula; and substituting the ideal cruising speed into a simulation model to obtain the RMS value of suspension rattle space and dynamic wheel load under a driving condition; if there is the risk of hitting a limit block or losing a wheel-road contact, compensating the ideal cruising speed to get the optimal cruise speed.

2. The control method according to claim 1, further comprising:

a suspension control submodule determining a current dynamic performance requirement of the vehicle based on the vehicle speed and the road condition; and based on which, switching a corresponding controllable suspension control parameter;

subsequently, calculating an ideal suspension control force based on an adopted control strategy, a controllable suspension control parameter and a current vehicle state information; sending a control signal to a vehicle suspension system to track the ideal suspension control force for vibration suppression.

3. The control method according to claim 1, wherein the risk of hitting the limit block is determined by: if the RMS value of suspension rattle space exceeds one third of a maximum value, a suspension has a 99.7% probability of hitting the limit block, and the ideal cruising speed needs to be compensated; on the contrary, the speed is not compensated.

4. The control method according to claim 1, wherein the risk of losing wheel-road contact is determined by: if the RMS value of dynamic wheel load exceeds one third of wheel static load, there is a 99.7% probability of losing the wheel-road contact, and the ideal cruising speed needs to be compensated; on the contrary, the speed is not compensated.

5. The control method according to claim 4, wherein the compensation for the ideal cruising speed is achieved by:

$$v_{optimal} = \left(1 - \sum_{i=1}^{4} \frac{\text{rms}(F_{d\_i}) - 1/3 \cdot F_{start\_i}}{F_{start\_i}} - \sum_{i=1}^{4} \frac{\text{rms}(f_{d\_i}) - 1/3 \cdot f_{max}}{f_{max}}\right) \times v_{ideal}$$

wherein $\text{rms}(F_{d\_i})$ is the RMS value of dynamic load of each wheel; $\text{rms}(f_{d\_i})$ is the RMS value of suspension rattle space at each corner of the vehicle; $F_{start\_i}$ is the static load of each wheel, i=1, 2, 3 and 4, which is corresponding to four wheels, respectively; $f_{max}$ is a maximum suspension rattle space; and $v_{ideal}$ is the ideal cruising speed.

6. The control method according to claim 2, wherein the controllable suspension control parameter is determined by means of:

judging dynamic performance requirements of the vehicle under different driving conditions by combining the road condition and the vehicle speed, and designing a comprehensive performance evaluation function representing different dynamic performance of the vehicle, wherein the comprehensive performance evaluation function simultaneously considers ride comfort and handling performance of the vehicle; and taking the comprehensive performance evaluation function P as a fitness function, and using an optimization algorithm to obtain the suspension control parameter under different dynamic performance requirements of the vehicle.

7. The control method according to claim 6, wherein an expression of comprehensive performance evaluation function P is as follows:

$$P = \sqrt{w_1 \cdot \frac{\mathrm{rms}(\ddot{z}_s)}{\mathrm{rms}(\ddot{z}_{sf})} + w_2 \cdot \frac{\mathrm{rms}(F_d)}{\mathrm{rms}(F_{df})}}$$

wherein $w_1$ and $w_2$ are weight coefficients of ride comfort and handling performance, respectively; $\mathrm{rms}(\ddot{z}_s)$ is the RMS value of weighted acceleration of vehicle centroid; $\mathrm{rms}(F_d)$ is an average of the RMS values of the dynamic loads of the four wheels; $\mathrm{rms}(\ddot{z}_{sf})$ and $\mathrm{rms}(F_{df})$ are relevant values for a reference passive suspension.

8. The control method according to claim 6, wherein the dynamic performance requirements of the vehicle under different driving conditions are as follows: when the vehicle travels at a speed greater than or equal to 90 km/h, the dynamic performance requirement is handling performance; when the vehicle travels at a speed less than 30 km/h, the dynamic performance requirement is ride comfort.

9. The control method according to claim 2, wherein the control strategy comprises a model predictive control strategy, a linear quadratic optimal control strategy, or a modified skyhook control strategy.

10. The control method according to claim 2, wherein a priority of dynamic performance requirements of the vehicle is higher than that of comfort requirements.

* * * * *